(12) United States Patent
Mochizuki et al.

(10) Patent No.: US 7,684,149 B2
(45) Date of Patent: Mar. 23, 2010

(54) MAGNETIC HEAD AND MAGNETIC DISK STORAGE APPARATUS MOUNTING THE SAME

(75) Inventors: Masafumi Mochizuki, Tokyo (JP); Kaori Suzuki, Tokyo (JP); Kimitoshi Etoh, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1111 days.

(21) Appl. No.: 10/976,720

(22) Filed: Oct. 29, 2004

(65) Prior Publication Data

US 2006/0092575 A1 May 4, 2006

(30) Foreign Application Priority Data

Feb. 25, 2004 (JP) ............................. 2004-050342

(51) Int. Cl.
*G11B 5/40* (2006.01)
(52) U.S. Cl. .................................. 360/125.3
(58) Field of Classification Search .............. 360/125.3, 360/110, 125.01, 125.02, 125.03, 125.16, 360/317, 123.58, 125.71, 125.72, 123.12
See application file for complete search history.

(56) References Cited

U.S. PATENT DOCUMENTS

| | | | | |
|---|---|---|---|---|
| 5,003,423 | A * | 3/1991 | Imamura et al. | 360/125.03 |
| 6,477,008 | B1 | 11/2002 | Chang et al. | 360/125.71 |
| 6,785,097 | B2 * | 8/2004 | Okada et al. | 360/317 |
| 6,842,313 | B1 * | 1/2005 | Mallary | 360/319 |
| 7,042,682 | B2 * | 5/2006 | Hu et al. | 360/317 |
| 2002/0126423 | A1 | 9/2002 | Terunuma et al. | 360/319 |
| 2003/0043513 | A1 | 3/2003 | Lin | 360/317 |
| 2005/0018346 | A1 * | 1/2005 | Okada et al. | 360/125 |
| 2005/0135007 | A1 * | 6/2005 | Nishikawa et al. | 360/126 |
| 2005/0180048 | A1 * | 8/2005 | MacDonald et al. | 360/125 |
| 2006/0002018 | A1 * | 1/2006 | Fukui et al. | 360/125 |
| 2006/0002020 | A1 * | 1/2006 | Pokhil et al. | 360/126 |
| 2006/0098339 | A1 * | 5/2006 | Koyama et al. | 360/126 |
| 2006/0171068 | A1 * | 8/2006 | Taguchi | 360/125 |
| 2007/0223142 | A1 * | 9/2007 | Takekuma et al. | 360/131 |

FOREIGN PATENT DOCUMENTS

| | | |
|---|---|---|
| JP | 2000-315302 | 11/2000 |
| JP | 2002-222504 | 8/2002 |
| JP | 2002-314165 | 10/2002 |
| JP | 2003-045008 | 2/2003 |
| JP | 2003-157511 | 5/2003 |

* cited by examiner

*Primary Examiner*—Julie Anne Watko
(74) *Attorney, Agent, or Firm*—Townsend and Townsend and Crew LLP; Rambod Nader

(57) ABSTRACT

Embodiments of the invention provide a magnetic head which assures an improved format efficiency without increase in the magnetic field intensity applied at a read element. In one embodiment, a magnetic head incorporates a write head having a main pole and an auxiliary pole, and a read head having a read element between reader shields. An auxiliary shield as a magnetic body is provided between the main pole and reader shields or on the opposite side of the main pole with the reader shields between the main pole and the auxiliary shield.

13 Claims, 10 Drawing Sheets recession of auxiliary shield

MAGNETIC HEAD AND MAGNETIC DISK STORAGE APPARATUS MOUNTING THE SAME

CROSS-REFERENCES TO RELATED APPLICATIONS

This application claims priority from Japanese Patent Application No. 2004-050342, filed Feb. 25, 2004, the entire disclosure of which is incorporated herein by reference.

BACKGROUND OF THE INVENTION

The present invention relates to a perpendicular recording magnetic head, a manufacturing method thereof, and a magnetic disk storage apparatus which incorporates the same.

A magnetic disk storage apparatus incorporates a magnetic recording medium and a magnetic head, and data on the recording medium is read or written by the magnetic head. In order to increase the capacity of the magnetic disk storage, the areal density has to be increased. However, in the conventional longitudinal recording method, the thermal fluctuation in medium magnetization prevents one from achieving the higher areal density. A solution to this problem is a perpendicular recording method whereby the recorded magnetizations are aligned in the direction perpendicular to the medium.

The perpendicular recording method is available in two types: one type uses a double-layered perpendicular medium having a soft underlayer and the other type uses a single-layered perpendicular medium having no soft underlayer. When a double-layered perpendicular medium is used as a recording medium, it is necessary to use a single-pole type head which has a main pole and an auxiliary pole for recording. In this case, a higher magnetic field intensity can be applied to the medium. Taking into consideration that the head may have a skew angle, it is desirable that the shape of the main pole is trapezoidal that the width of the leading side is smaller than that of the trailing side. FIG. 2 schematically shows the structure of a conventional magnetic head including a single-pole type head. As shown in FIG. 2, a conventional magnetic head includes a lower shield 8, a read element 7, an upper shield 9, an auxiliary pole 3, a thin film conductor coil 2, and a main pole 1 which are laminated in the downtrack direction (from the leading side) in the order of mention. The lower shield 8, read element 7 and upper shield 9 constitute a read head 24 while the auxiliary pole 3, thin film conductor coil 2 and main pole 1 constitute a write head (single-pole type head) 25. Japanese Patent Laid Open Publication No. 2003-45008 describes a single-pole type head in which a shield for an external magnetic field is located with a gap film between the main pole and shield in a way to be recessed from the surface opposite to the medium.

BRIEF SUMMARY OF THE INVENTION

The present invention relates to a perpendicular recording system which uses a perpendicular recording write head with a main pole and an auxiliary pole and a double-layered perpendicular recording medium with a soft underlayer. As shown in FIG. 2, since the conventional magnetic head has the auxiliary pole and the thin film coil between the read element and the main pole, the write-read element distance is large which causes a degradation of the format efficiency. A structure as shown in FIG. 3 has been proposed to avoid this problem, where the auxiliary pole is located on the trailing side of the main pole. This structure can decrease the write-read element distance.

Not only the write field intensity of the write head but also write-field gradients which determine the magnetization transitions are important factors for achieving a high recording density. In order to achieve a higher recording density, the write-field gradients must be increased. An approach to increasing the write-field gradients is a structure in which a magnetic body 32 is located on the trailing side of the main pole 1. Even in this structure, it is desirable that the auxiliary pole 3 is located on the trailing side of the main pole 1 as shown in FIG. 3, in order to make up a closed magnetic path.

However, in the structure shown in FIG. 3 where the main pole 1 is located on the leading side of the auxiliary pole 3, the magnetic field intensity applied at the read element 7 is higher than in the conventional magnetic head structure shown in FIG. 2. The reason for this is that as the main pole 1 and the read element 7 are closer to each other, the auxiliary pole 3 no longer exists between the lower shield and the upper shield (hereinafter these are sometimes called the "reader shields"). According to the three-dimensional magnetic field calculation made by the inventors, the magnetic field intensity applied at the read element in the conventional structure shown in FIG. 2 is $1.18 \times 10^4$ A/m while that in the structure shown in FIG. 3 is $4.40 \times 10^4$ A/m. This increase in magnetic field intensity, however, might cause an instability in reading characteristics or damage to the read element 7, making it difficult to achieve a high recording density in a magnetic disk storage apparatus.

Also, in Japanese Patent Laid Open Publication No. 2003-45008, the field intensity applied at the read element is not taken into consideration.

One feature of the present invention is to provide a magnetic head which assures an improved format efficiency without increase in the magnetic field intensity applied at the read element and also provide a magnetic disk storage apparatus which uses the head to achieve a high recording density.

According to an aspect of the present invention, a magnetic head includes a read head having a lower shield, an upper shield, and a magneto resistive element located between the upper and lower shields; and a write head having a main pole and an auxiliary pole. The magnetic head further includes an auxiliary shield as a magnetic body which is located on the leading side of the main pole. The main pole is located between the auxiliary pole and the upper shield. The auxiliary shield is located between the main pole and the upper shield or on the leading side of the lower shield so that leakage magnetic flux from the write head, particularly leakage magnetic field from the vicinity of the position of back contact in the area of connection of the main pole and auxiliary pole, is absorbed and the magnetic field intensity applied at the read element is reduced.

According to a feature of the present invention, the magnetic field intensity applied at the read element is reduced and the main pole of the write head is located closer to the read element to improve the format efficiency without deterioration in the read element or damage to it.

DETAILED DESCRIPTION OF THE INVENTION

Figure 1:
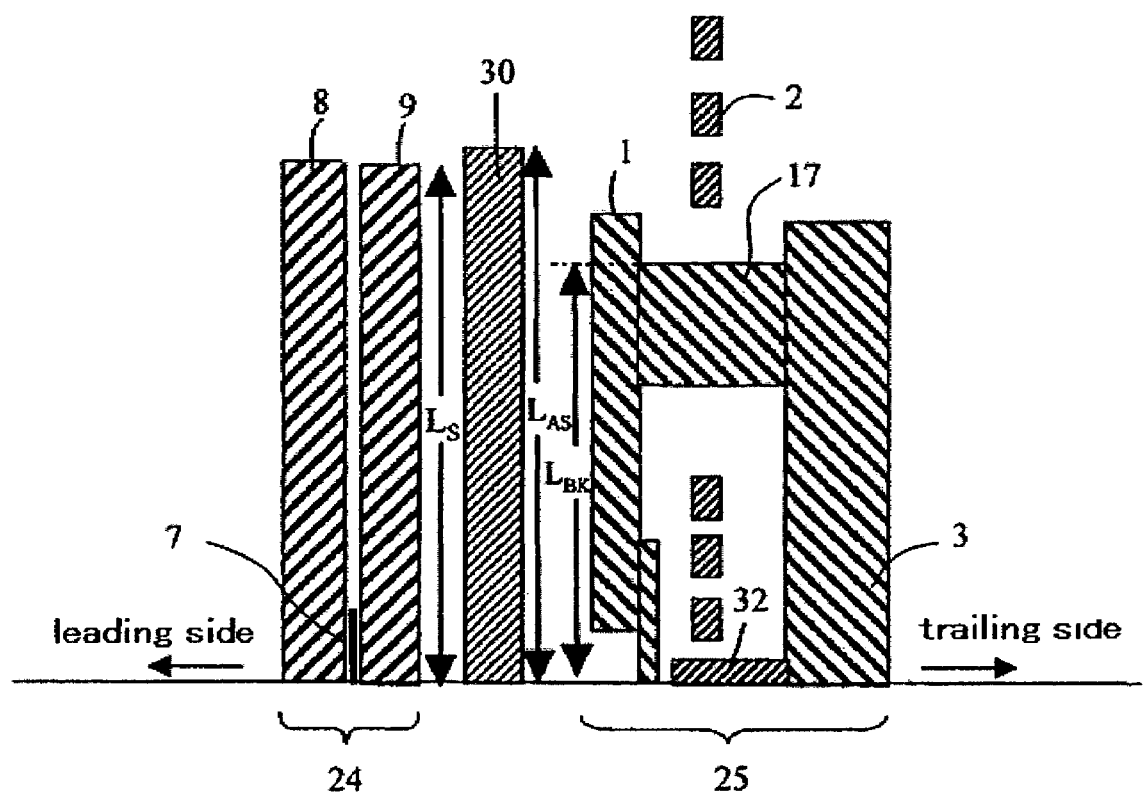
FIG. 1 is a schematic cross-section view showing a magnetic head according to an embodiment of the present invention.
Figure 2:
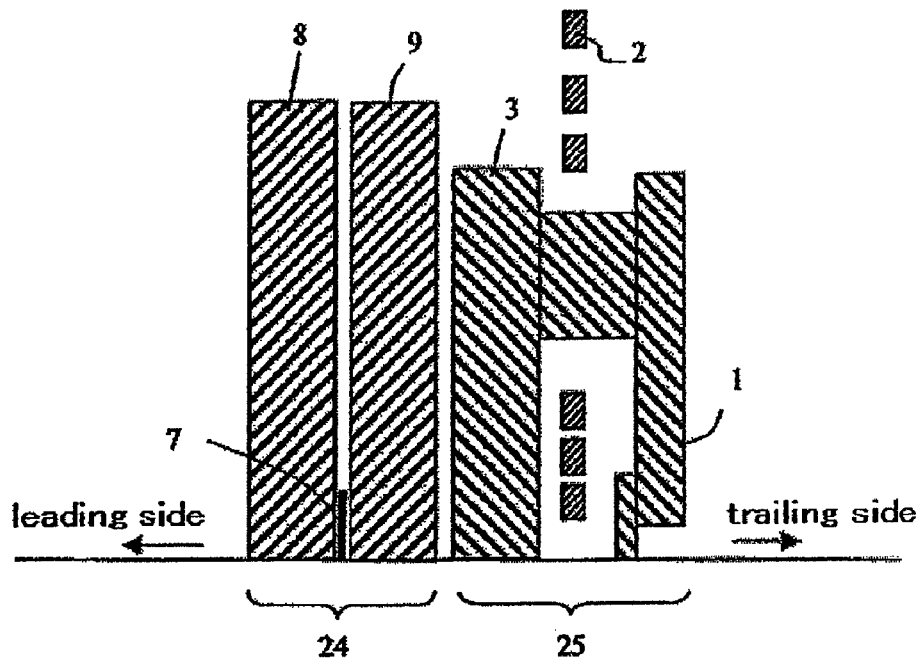
FIG. 2 shows the structure of a conventional magnetic head.

Specific embodiments of the present invention will be described referring to the accompanying drawings. In the drawings, elements with like functions are designated by like reference numerals to help reader understanding.

Figure 4:
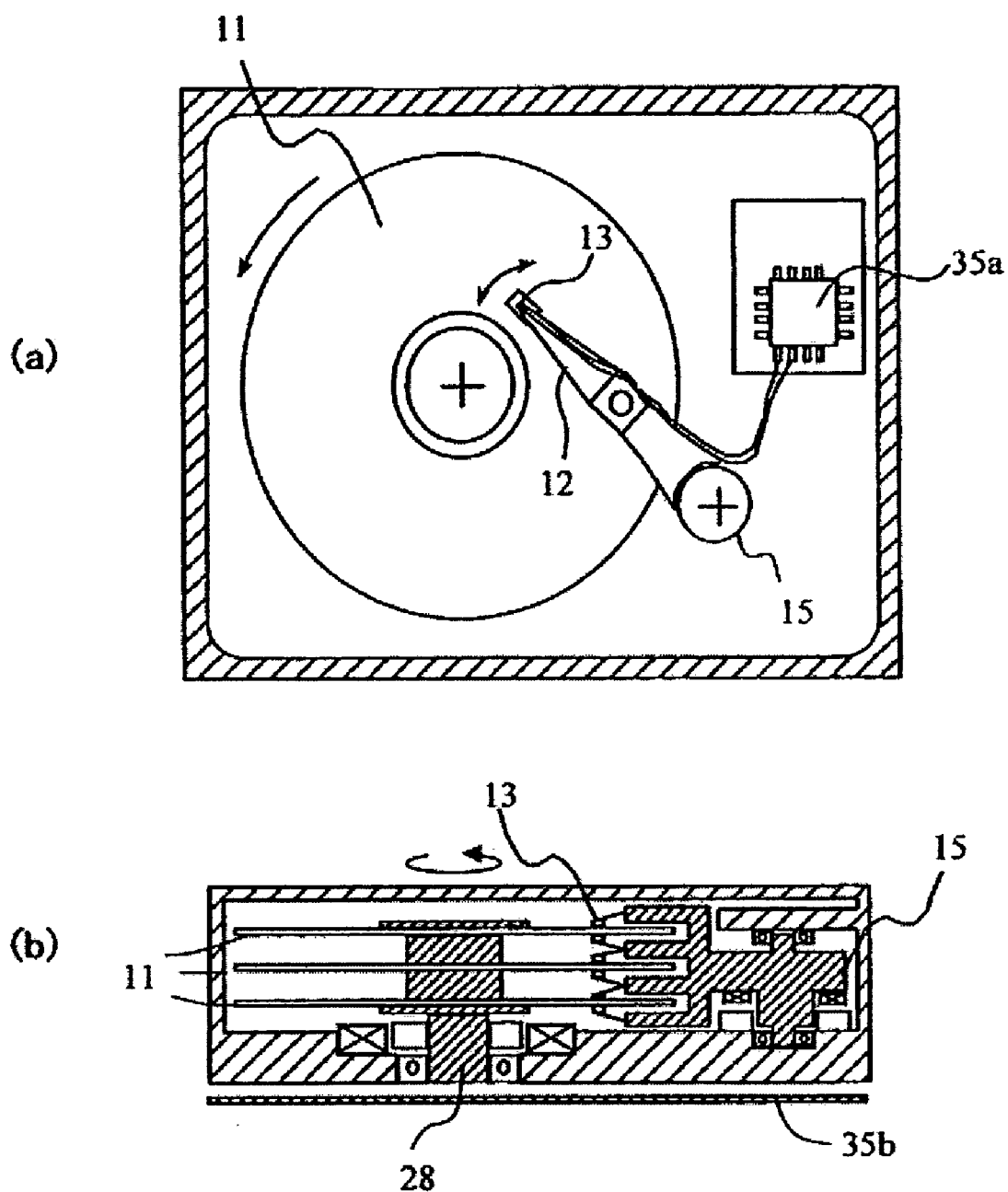
FIGS. 4(a) and 4(b) are schematic diagrams showing a magnetic disk storage apparatus.

FIGS. 4(a) and 4(b) are conceptual diagrams showing a magnetic disk storage apparatus according to an exemplary embodiment of the present invention. In this magnetic disk storage apparatus, a magnetic head mounted on a slider 13 fixed to the tip of a suspension arm 12 writes and reads magnetization signals at a given position on a magnetic disk (magnetic recording medium) 11 which is rotated by a motor 28. A rotary actuator 15 is driven to select a magnetic head position (track) in the magnetic disk radial direction. A write signal to the magnetic head and a read signal from it are processed by signal processing circuits 35 a and 35 b.

FIG. 1 is a schematic cross-section view showing a magnetic head according to an embodiment of the present invention. This magnetic head is a write/read combination head which has a write head 25 with a main pole 1 and an auxiliary pole 3, and a read head 24 with a read element 7. The main pole 1 and the auxiliary pole 3 are magnetically connected in a position away from the air bearing surface through a pillar 17 and a thin film coil 2 is interlinked with a magnetic circuit which is composed of the main pole 1, auxiliary pole 3, and pillar 17. The read element 7, which is a giant magneto resistive element (GMR) or a tunneling magneto resistive element (TMR), is located between a pair of magnetic shields (reader shields): a lower shield 8 (leading side) and an upper shield 9 (trailing side). The main pole 1 is located on the leading side of the auxiliary pole 3. A magnetic body 32 for increasing magnetic field gradients is located on the trailing side of the main pole 1.

As mentioned earlier, when the main pole 1 is located on the leading side of the auxiliary pole 3, the problem that the magnetic field intensity applied at the read element 7 is increased arises. Therefore, according to this embodiment of the present invention, an auxiliary shield 30 as a magnetic body is provided on the leading side of the main pole 1, or in the case shown in FIG. 1, between the main pole 1 and the upper shield 9 of the read head 24. This structure decreases the magnetic flux flowing from the main pole 1 to the lower and upper shields 8 and 9 and reduces the magnetic field intensity applied at the read element 7.

Figure 3:
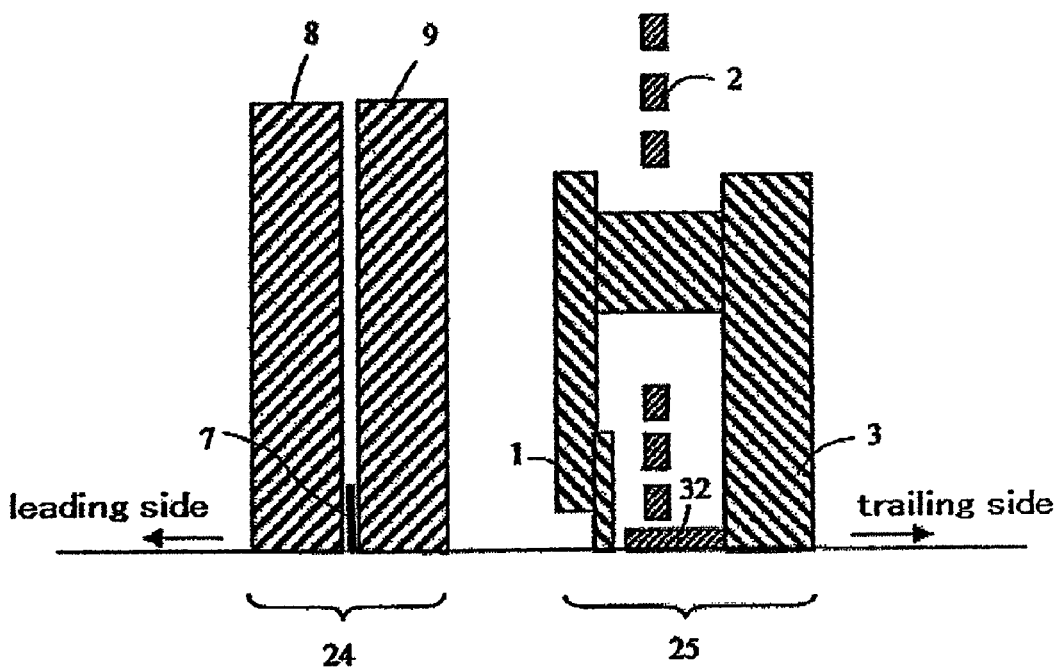
FIG. 3 shows a magnetic head in which an auxiliary pole is on the trailing side of the main pole.

According to the three-dimensional magnetic field calculation made by the inventors, the magnetic field intensity applied at the read element in the structure shown in FIG. 3 is $4.40 \times 10^4$ A/m. This increase in the magnetic field intensity applied at the read element might cause deterioration in reading characteristics or damage to the read element. This three-dimensional magnetic field intensity calculation assumes that the saturation flux density of the main pole is 2.4 T, the geometric width is 120 nm, and the thickness is 150 nm. Also it is assumed that the saturation flux density of the auxiliary pole 3 and reader shields 8 and 9 is 1.0 T, and the distance between the main pole and the upper shield is 5 µm. On the other head, in the magnetic head according to the present embodiment as shown in FIG. 1, when the distance between the main pole and the upper shield is 5 µm and that between the main pole 1 and the auxiliary shield 30 is 2 µm, the magnetic field intensity applied at the read element is remarkably low at $8.11 \times 10^3$ A/m. Here, the thickness of the auxiliary shield 30 is 2 µm and its length is 20 µm. The saturation flux density of the auxiliary shield 30 is assumed to be 1.0 T.

When the head has an auxiliary shield 30 as shown in FIG. 1, write-field gradients can be sharp without deterioration in reading characteristics. The use of the auxiliary shield 30 increases resistance to the influence of an external magnetic field. The influence of an external magnetic field here refers to a problem that the main pole might be excited by a magnetic field which is stray in the magnetic disk storage apparatus, namely a magnetic field generated by a factor other than write current. For example, what is called an "external magnetic field" and consequently a leakage magnetic field from the main pole might erase written signals on the medium. However, according to the present embodiment, the auxiliary shield absorbs an external magnetic field, which reduces the intensity of the magnetic field from the main pole, thereby preventing the problem that written signals on the medium might be erased.

It is desirable that the distance between the auxiliary shield 30 and the upper shield 9 is about 1 µm or more. When the distance between the auxiliary shield 30 and upper shield 9 should be insufficient, much magnetic flux would flow from the auxiliary shield 30 to the upper shield 9 and consequently the magnetic field intensity applied at the read element 7 would increase. According to the inventors' calculation, when the distance between the auxiliary shield 30 and the upper shield 9 is 0.1 µm, the magnetic field intensity applied at the read element 7 is 1.5 times more than when it is 1 µm.

Figure 5:
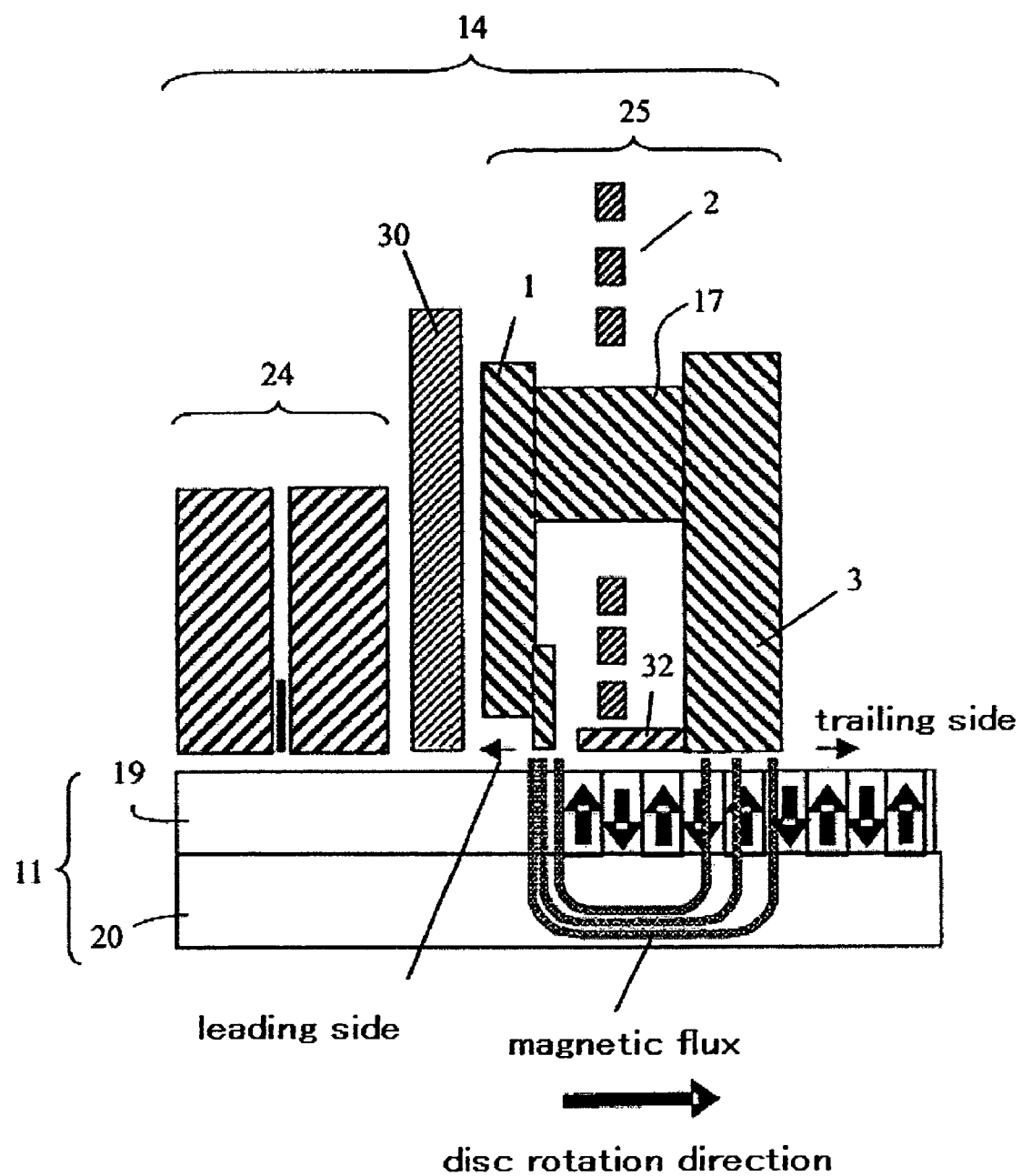
FIG. 5 is a schematic diagram illustrating how perpendicular recording is done.

FIG. 5 shows the relation between the perpendicular recording magnetic head 14 and the magnetic disk 11 and outlines how perpendicular recording is done. A magnetic field from the main pole 1 of the write head 25 passes through a recording layer 19 and a soft underlayer 20 of the magnetic disk medium 11 and enters the auxiliary pole 3 to make up a magnetic circuit so that a magnetization pattern is recorded on the recording layer 19. There may be an intermediate layer between the recording layer 19 and the soft underlayer 20. The read element 7 of the read head 24 may be a giant magneto resistive element (GMR) or a tunneling magneto resistive element (TMR).

Figure 6:
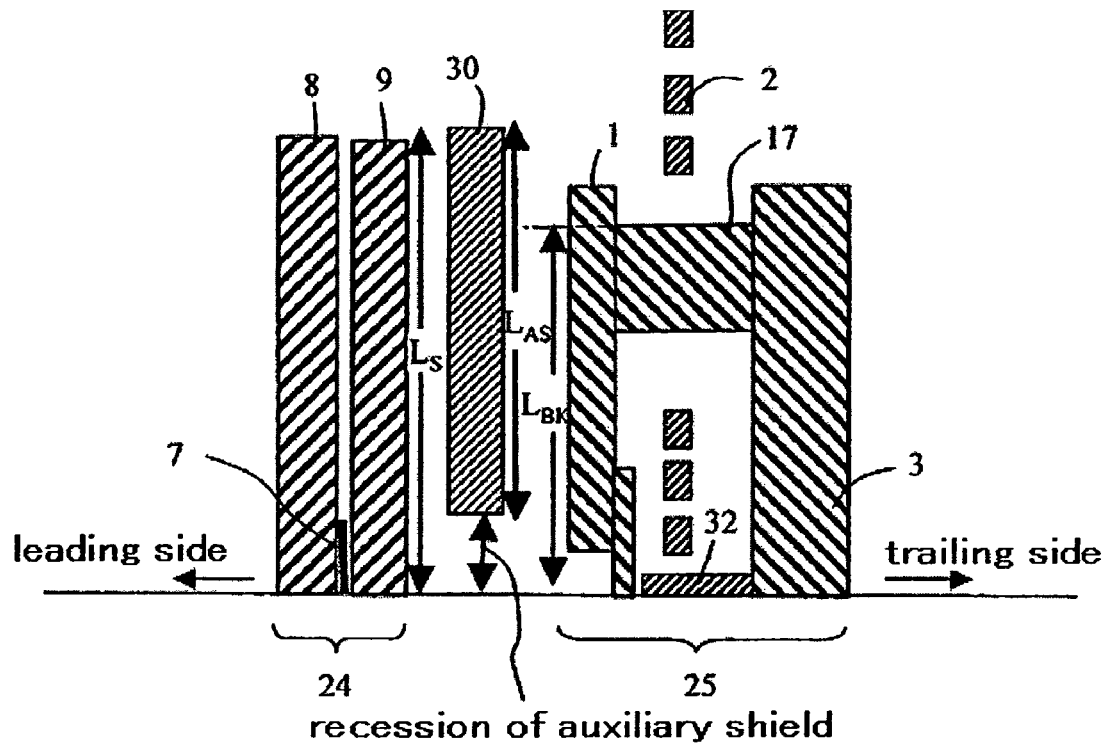
FIG. 6 is a schematic cross-section view showing a magnetic head according to another embodiment of the present invention.

FIG. 6 is a schematic cross-section view showing a magnetic head according to another embodiment of the present invention. In this magnetic head, the auxiliary shield 30 is recessed from the air bearing surface. This structure reduces the magnetic field intensity applied from the auxiliary shield 30 to the recording medium. When the recession of the auxiliary shield 30 is larger, the resistance of the magnetic path from the auxiliary shield 30 to the soft underlayer of the magnetic recording medium is larger, which may make it impossible to reduce the magnetic field intensity applied at the read element. Hence, preferably the recession of the auxiliary shield 30 from the air bearing surface should be about 1 μm or less.

Figure 7:
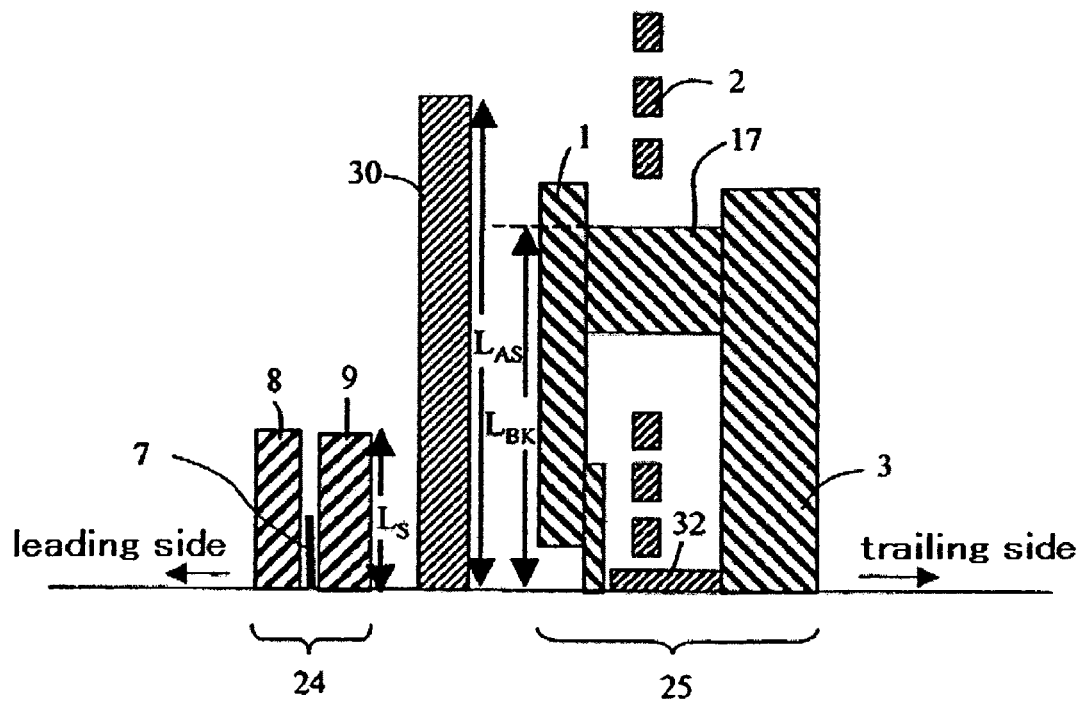
FIG. 7 is a schematic cross-section view showing a magnetic head according to another embodiment of the present invention.

FIG. 7 is a schematic cross-section view showing a magnetic head according to another embodiment of the present invention. Regarding the relation between the length of the auxiliary shield 30 in the direction of the element height, $L_{AS}$, and the length of the reader shields 8 and 9 in the direction of the element height, $L_S$, it is desirable that the length of the auxiliary shield 30 is longer than the length of the reader shields 8 and 9 as illustrated in FIG. 7 so that magnetic flux does not flow from the vicinity of the position of back contact into the reader shields 8 and 9 while writing operation is under way. Another approach is that as illustrated in the figure, $L_s$, the length of the reader shields 8 and 9 in the direction of the element height is shorter than $L_{BK}$, the length from the air bearing surface to the position of back contact (position farthest from the air bearing surface in the area of connection of the main pole and auxiliary pole). In addition, it is desirable that the width of the auxiliary shield 30 in the direction of the track width is larger than the width of the reader shields 8 and 9 in the direction of the track width.

Figure 8:
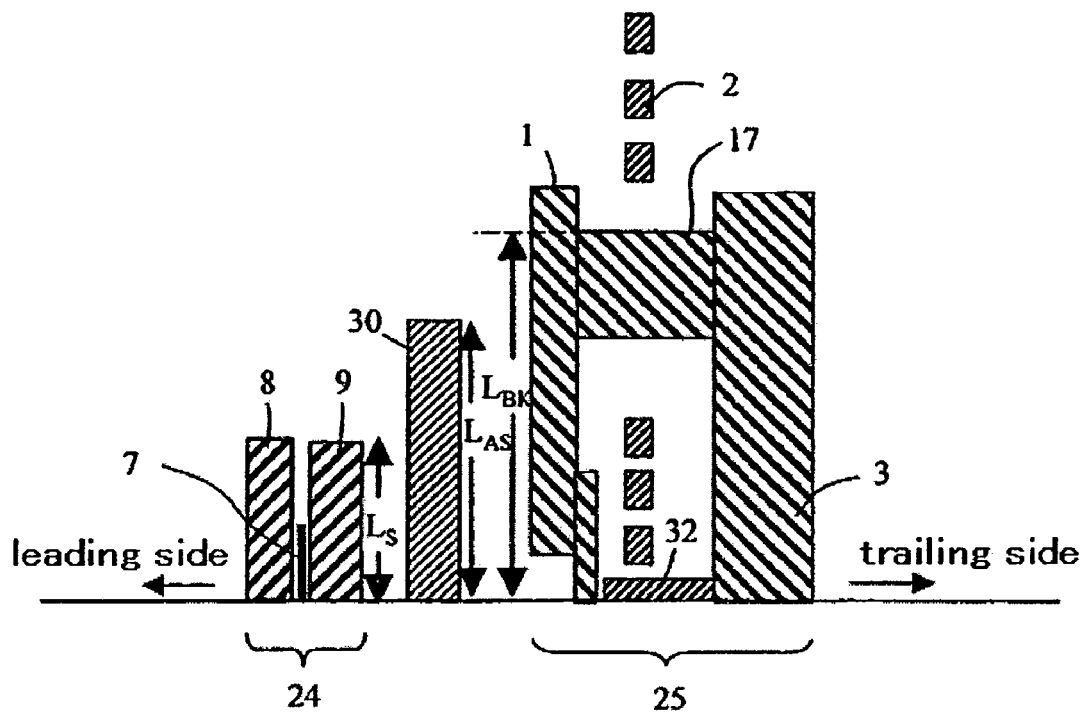
FIG. 8 is a schematic cross-section view showing a magnetic head according to another embodiment of the present invention.

FIG. 8 is a schematic cross-section view showing a magnetic head according to another embodiment of the present invention. As illustrated in FIG. 8, it is desirable that $L_{AS}$, the length of the auxiliary shield 30 in the direction of the element height is shorter than $L_{BK}$, the length of the main pole 1 from the air bearing surface to the position of back contact, and longer than $L_S$, the length of the reader shields 8 and 9 in the direction of the element height. The reason for this is that this structure reduces the magnetic field intensity applied at the read element and at the same time decreases the magnetic flux flowing into the auxiliary shield 30 and reduces the leakage magnetic field from the auxiliary shield 30 to the medium.

Figure 9:
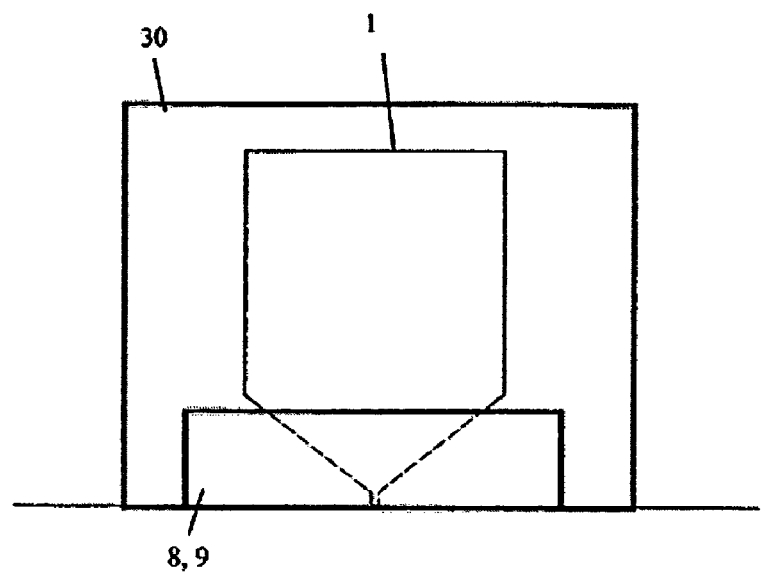
FIG. 9 is a schematic plan view showing a magnetic head according to an embodiment of the present invention, as viewed from the reader shields.

FIG. 9 is a schematic plan view showing a magnetic head according to an embodiment of the present invention, as viewed from the reader shields. It is desirable that the area of the auxiliary shield 30 is larger than that of the lower shield 8 and the upper shield 9. Also, it is desirable that the width of the auxiliary shield 30 in the direction of the track width is larger than that of the lower shield 8 and the upper shield 9. Owing to this structure, more magnetic flux is absorbed by the auxiliary shield 30 and the magnetic flux which flows from the main pole 1 into the lower and upper shields 8 and 9 decreases, resulting in reduction in the magnetic field intensity applied at the read element 7. By contrast, when the area of the auxiliary shield 30 should be smaller than the area of the lower and upper shields 8 and 9 or the width of the auxiliary shield 30 in the direction of the track width should be smaller than the width of the lower and upper shields 8 and 9 in the direction of the track width, undesirably no magnetic body as a shield would exist between the reader shields 8 and 9 and the position of back contact of the main pole 1.

Figure 10:
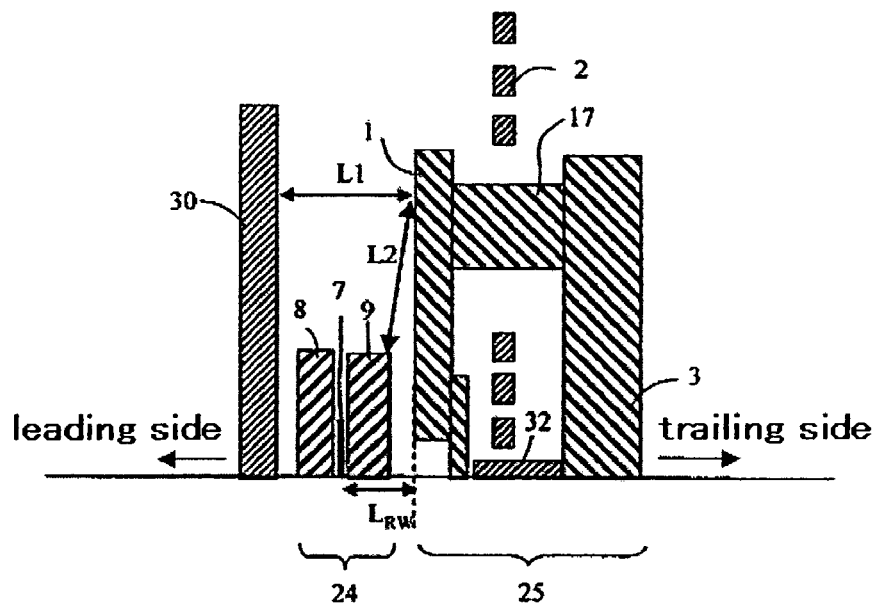
FIG. 10 is a schematic cross-section view showing a magnetic head according to a further embodiment of the present invention.

FIG. 10 is a schematic cross-section view showing a magnetic head according to a further embodiment of the present invention. In the magnetic head according to this embodiment, the auxiliary shield 30 is located on the leading side of the main pole 1, unlike the above embodiments where it is between the main pole 1 and the reader shields 8 and 9, in a way that the reader shields 8 and 9 are between the main pole 1 and the auxiliary shield 30. Specifically, the auxiliary shield 30 is located between a substrate of alumina titanium carbide or glass and the reader shields 8 and 9. In this embodiment, the thickness of the auxiliary shield 30 is about 2 μm and its length is about 20 μm. The saturation flux density is assumed to be 1.0 T. This arrangement is also effective in reducing the magnetic field intensity applied at the read element.

Figure 11:
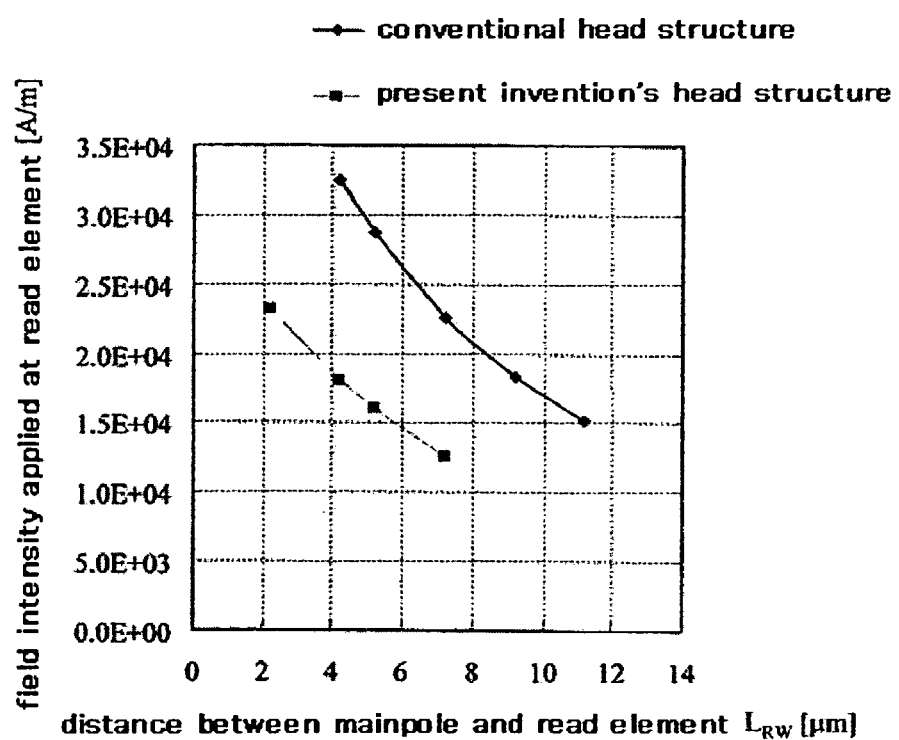
FIG. 11 shows the relation between the magnetic field intensity applied at the read element and the distance between the read element and the main pole, $L_{RW}$.

FIG. 11 shows comparison between the conventional head structure (FIG. 3) and the present embodiment's head structure (FIG. 10) in the relation between the magnetic field intensity applied at the read element and the distance $L_{RW}$ from the main pole trailing end to the read element. In both the structures, the height of the reader shields is 5 μm, or shorter than the position of back contact. The only difference between the two structures is that one has an auxiliary shield and the other does not. In either structure, as $L_{RW}$, the distance from the main pole 1 to the read element 7 increases, the magnetic field intensity applied at the read element 7 decreases. However, when they are equal in distance $L_{RW}$, the magnetic field intensity applied at the read element 7 in the present embodiment's structure (FIG. 10) is about 60% of that in the conventional structure (FIG. 3). Therefore, the present embodiment (FIG. 10) makes it possible that $L_{RW}$, the distance from the main pole 1 to the read element 7, may be shorter while the magnetic field intensity applied at the read element 7 is the same as in the conventional structure. This means that the apparatus's format efficiency can be improved. When the reader shields 8 and 9 are between the main pole 1 and the auxiliary shield 30 (FIG. 10), because of the absence of a magnetic body between the main pole and the reader shields, the distance between the main pole 1 and the read element 7 may be shorter than in the structure in which the auxiliary shield 30 is located between the main pole 1 and the reader shields 8 and 9 (FIG. 1).

In the structure shown in FIG. 10 in which the reader shields 8 and 9 are between the main pole 1 and the auxiliary shield 30, it is desirable that the direct distance from the position of back contact of the main pole 1 to the auxiliary shield 30, L1, is smaller than the direct distance from the position of back contact of the main pole to the reader shields, L2. In the reverse case, i.e., when L1 should be larger than L2, magnetic flux from the position of back contact of the main pole 1 would more easily flow from the auxiliary shield 30 to the lower and upper shields 8 and 9 and the effect of the auxiliary shield 30 would become smaller.

It is desirable that the permeability of the auxiliary shield material (μ1) is higher than that of the reader shield material (μ2). More preferably, μ1/L1 should be larger than μ2/L2. This makes it easier for magnetic flux from the position of back contact of the main pole 1 to flow to the auxiliary shield 30 and improves the effect of reduction in the magnetic field intensity applied at the read element. In the reverse case, namely when μ1/L1 should be smaller than μ2/L2, magnetic flux from the position of back contact of the main pole 1 would more easily flow from the auxiliary shield 30 to the lower and upper shields 8 and 9 and lowers the effect of the auxiliary shield.

It is also desirable that the distance between the auxiliary shield 30 and the lower shield 8 is about 1 μm or more. When this distance should be small, more magnetic flux would flow from the auxiliary shield 30 to the lower shield 8 and undesirably the magnetic field intensity applied at the read element 7 would be higher.

Figure 12:
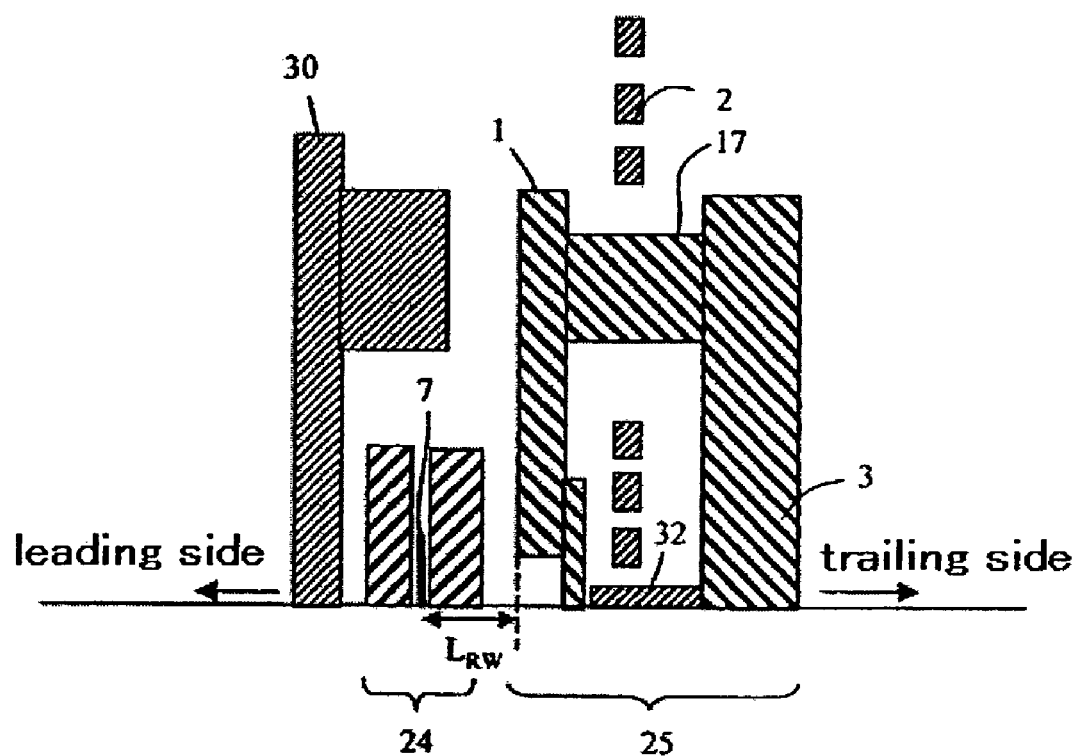
FIG. 12 is a schematic cross-section view showing a magnetic head according to another embodiment of the present invention.

When the reader shields 8 and 9 are between the main pole 1 and the auxiliary shield 30, an upper part of the auxiliary shield 30 may protrude toward the back contact position side of the main pole 1 as illustrated in FIG. 12. This also makes it easier for the magnetic flux from the position of back contact of the main pole 1 to flow to the auxiliary shield 30, resulting in improvement in the effect of reduction in the magnetic field intensity applied at the read element. It is desirable that the length of the auxiliary shield 30 in the direction of the element height is longer than the length of the reader shields in the direction of the element height and that the width of the auxiliary shield 30 in the direction of the track width is larger than the width of the reader shields.

Figure 13:
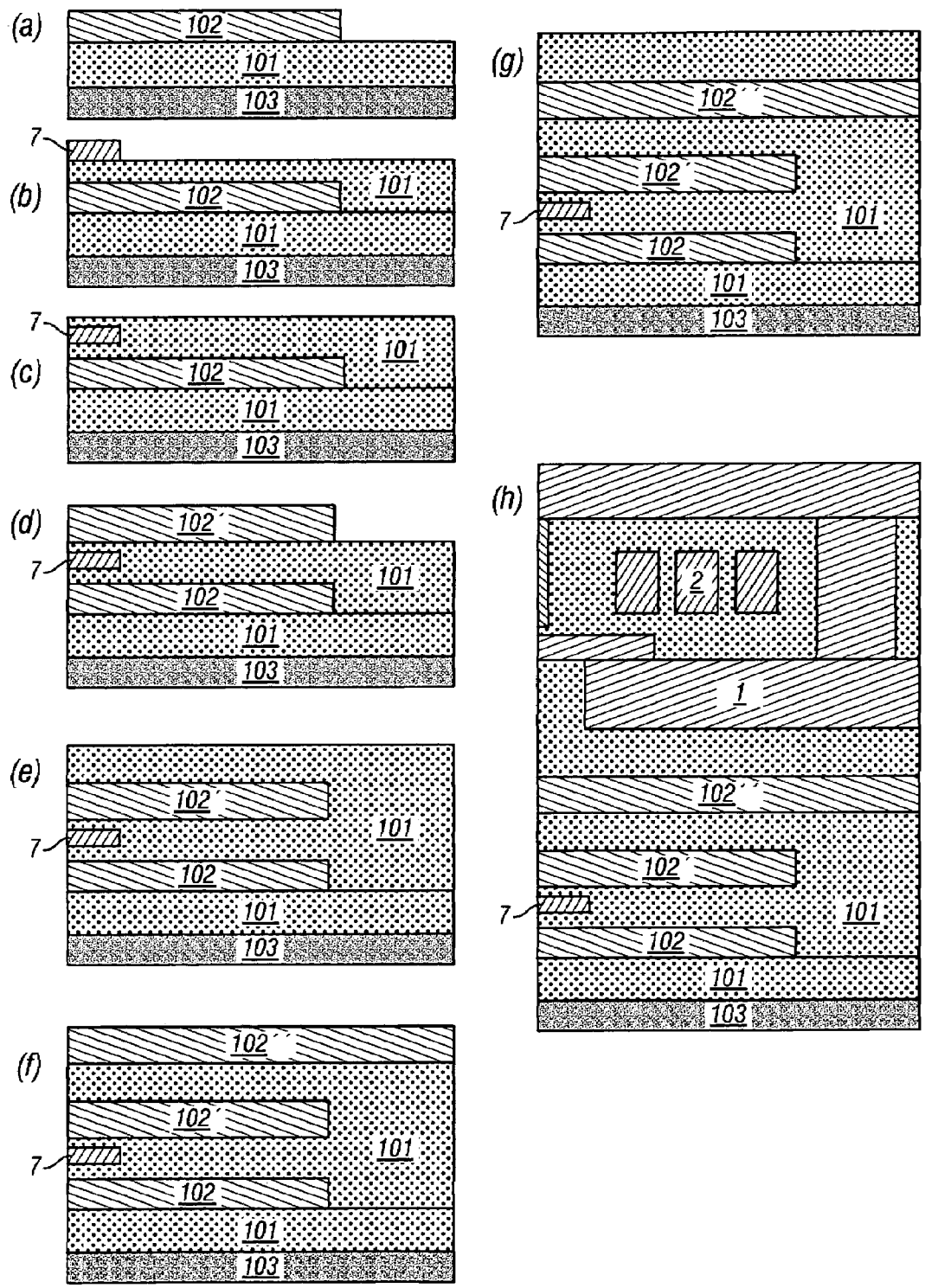
FIG. 13 is a set of cross-section views showing the process of manufacturing a magnetic head according to an embodiment of the present invention.

Next, a magnetic head manufacturing method according to an embodiment of the present invention will be described. FIG. 13 consists of cross-section views illustrating the steps of manufacturing a magnetic head in which an auxiliary shield as a magnetic body is between a main pole and an upper shield of a read head.

At step (a), an inorganic insulating layer 101 is formed on a substrate 103 of alumina titanium carbide, glass or the like. A magnetic layer 102 which is to constitute a lower shield is formed on the flat inorganic insulating layer 101 by flame coating. The length of the magnetic layer 102 should be shorter than the length up to the position of back contact which will be later determined. At step (b), an inorganic insulating layer 101 which is to constitute a lower gap is formed thereover by sputtering and flattened by a chemical mechanical polish (CMP) process. Then, a read element 7 and an electrode layer and a bias layer for electrifying it are formed thereover. At step (c), an inorganic insulating layer 101 which is to constitute an upper gap layer is formed by sputtering in a way to cover the read element 7, electrode layer, and bias layer. At step (d), a magnetic layer 102' which is to constitute an upper shield is formed by flame coating. The length of the magnetic layer 102' should be shorter than the length of an auxiliary shield and the length up to the position of back contact which will be later determined.

After this, at step (e), an inorganic insulating layer 101 is formed and at step (f), a magnetic layer 102'' which is to constitute an auxiliary shield is formed by flame coating. Then, at step (g), an inorganic insulating layer 101 is formed and at step (h), procedures of making a main pole, a magnetic body on the trailing side of the main pole, coils, an auxiliary pole and the like sequentially are taken to obtain a magnetic head according to the embodiments of the present invention.

Figure 14:
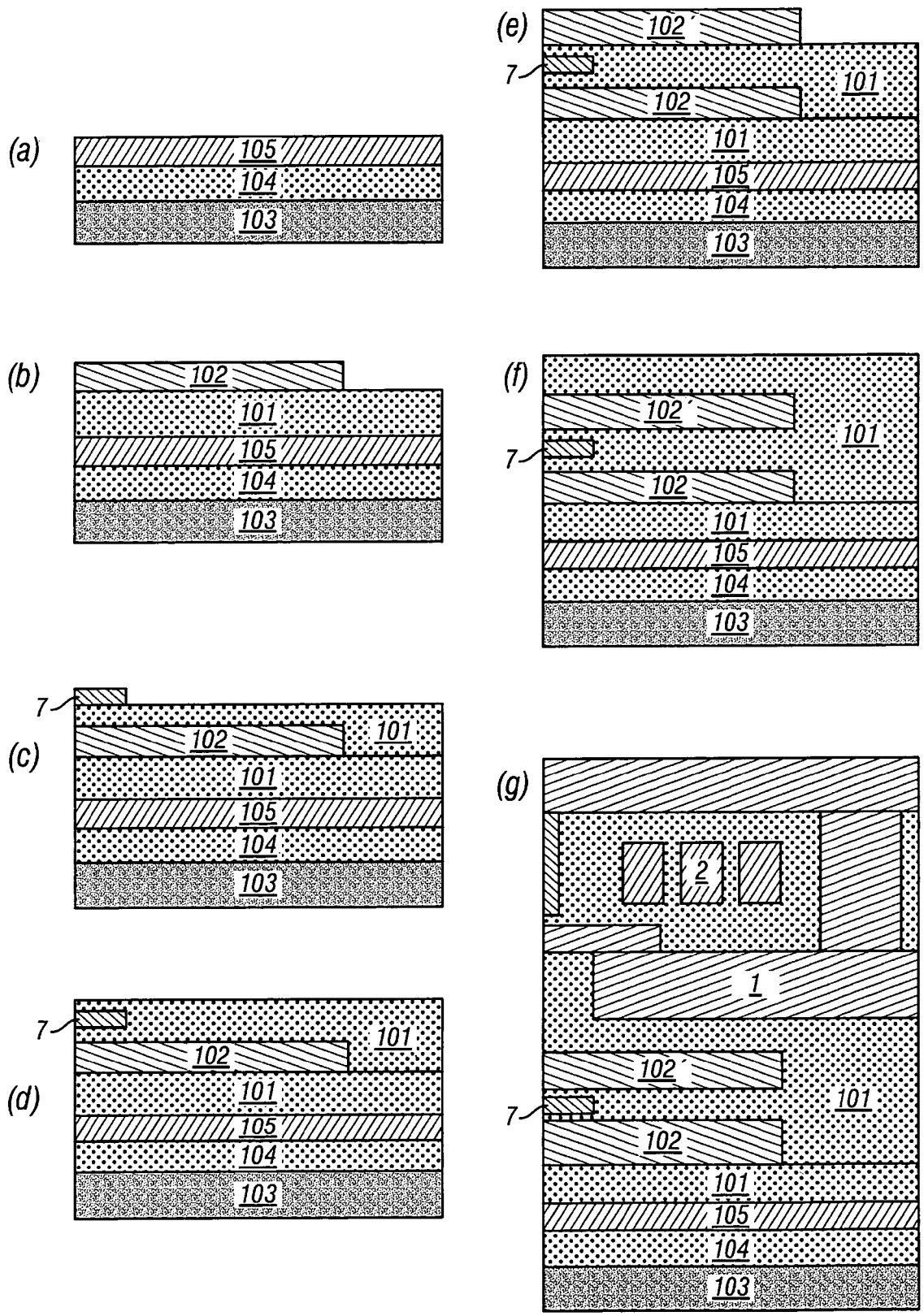
FIG. 14 is a set of cross-section views showing the process of manufacturing a magnetic head according to another embodiment of the present invention.

FIG. 14 consists of cross-section views illustrating the steps of manufacturing a magnetic head in which the reader shields are between the main pole and the auxiliary shield.

At step (a), an inorganic insulating layer 104 is formed on a substrate 103 of alumina titanium carbide, glass or the like. A magnetic layer 105 which is to constitute an auxiliary shield is formed on the flat inorganic insulating layer 104 by flame coating. At step (b), an inorganic insulating layer 101 is formed thereover and then a magnetic layer 102 which is to constitute a lower shield is formed by flame coating. The length of the magnetic layer 102 should be shorter than the length up to the position of back contact which will be later determined. At step (c), an inorganic insulating layer 101 which is to constitute a lower gap is formed thereover by sputtering and flattened by a chemical mechanical polish (CMP) process. Then, a read element 7 and an electrode layer and a bias layer for electrifying it are formed thereover. At step (d), an inorganic insulating layer 101 which is to constitute an upper gap layer is formed by sputtering in a way to cover the read element 7, electrode layer and bias layer. At step (e), a magnetic layer 102' which is to constitute an upper shield is formed by flame coating. The length of the magnetic layer 102' should be shorter than the length up to the position of back contact which will be later determined. After this, at step (f), an inorganic insulating layer 101 is formed and at step (g), procedures of making a main pole, a magnetic body on the trailing side of the main pole, coils, an auxiliary pole and the like are sequentially taken to obtain a magnetic head according to the embodiments of the present invention.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic head comprising:
   a read head proximate to a leading side and having a lower shield proximate to the leading side, an upper shield distal from the leading side, and a magneto resistive element located between said lower and upper shields;
   a write head distal from the leading side and having a main pole proximate to the leading side and an auxiliary pole distal from the leading side; and
   an auxiliary shield as a magnetic body located between the leading side and the lower shield;
   wherein an upper part of the auxiliary shield protrudes toward a back contact position side of the main pole.

2. The magnetic head as claimed in claim 1, wherein a length of said auxiliary shield in a direction of an element height is longer than a length of said lower and upper shields in the direction of the element height.

3. The magnetic head as claimed in claim 1, wherein a length of said auxiliary shield in a direction of a track width is longer than a length of said lower and upper shields in the direction of the track width.

4. The magnetic head as claimed in claim 1, wherein a length of said auxiliary shield in a direction of an element height is shorter than a distance from an air bearing surface to a position farthest from the air bearing surface in an area of connection of said main pole and said auxiliary pole.

5. The magnetic head as claimed in claim 1, wherein a distance between said auxiliary shield and said upper shield is about 1 mm or more.

6. The magnetic head as claimed in claim 1, wherein the auxiliary shield is recessed from an air bearing surface.

7. The magnetic head as claimed in claim 1, wherein the auxiliary shield is larger in area than each the lower shield and the upper shield.

8. The magnetic head as claimed in claim 1, wherein a relation of $\mu_1/\mu_2$ is satisfied where $\mu_1$ represents permeability of said auxiliary shield and $\mu_2$ represents permeability of said upper and lower shields.

9. The magnetic head as claimed in claim 1, wherein a relation of $L1 \leq L2$ is satisfied where $L1$ represents a distance from a position farthest from the air bearing surface in an area of connection of said main pole and said auxiliary pole to the auxiliary shield and $L2$ represents a distance from a position farthest from the air bearing surface in an area of connection of said main pole and said auxiliary pole to said upper shield.

10. The magnetic head as claimed in claim 1, wherein a relation of $(\mu_1/L1) \geq (\mu_2/L2)$ is satisfied where $\mu_1$ represents permeability of said auxiliary shield, $\mu_2$ represents permeability of said upper shield, $L1$ represents a distance from a position farthest from an air bearing surface in an area of connection of said main pole and said auxiliary pole to the auxiliary shield, and $L2$ represents a distance from a position farthest from the air bearing surface in an area of connection of said main pole and said auxiliary pole to said upper shield.

11. The magnetic head as claimed in claim 1, wherein a length of said auxiliary shield in a direction of a track width is longer than a length of said lower and upper shields in the direction of the track width.

12. The magnetic head as claimed in claim 1, wherein a distance between said auxiliary shield and said lower shield is about 1 mm or more.

13. A magnetic disk storage apparatus comprising:
   a magnetic recording medium having a magnetic recording layer and a soft underlayer;
   a medium drive which drives said magnetic recording medium;
   a magnetic head which writes to, and reads from, said magnetic recording medium; and
   a magnetic head drive which drives said magnetic head with respect to said magnetic recording medium,
   wherein said magnetic head comprises
   a read head proximate to a leading side and having a lower shield proximate to the leading side, an upper shield distal from the leading side and a magneto resistive element located between said upper and lower shields;
   a write head distal from the leading side and having a main pole proximate to the leading side and an auxiliary pole distal from the leading side; and
   an auxiliary shield as a magnetic body which is located between the leading side and the lower shield;
   wherein an upper part of the auxiliary shield protrudes toward a back contact position side of the main pole.

* * * * *